United States Patent [19]
Ettinger

[11] 3,723,700
[45] Mar. 27, 1973

[54] WELDING GUN MEANS FOR FEEDING AND HOLDING HEAD-BEARING STUDS OR THE LIKE

[75] Inventor: Donald H. Ettinger, Royal Oak, Mich.

[73] Assignee: Warren Fastener Corporation, Mount Clemens, Mich.

[22] Filed: Feb. 28, 1972

[21] Appl. No.: 230,015

[52] U.S. Cl. ................................................. 219/98
[51] Int. Cl. ............................................... B23k 9/20
[58] Field of Search ........................................ 219/98

[56] References Cited

UNITED STATES PATENTS 2,892,069  6/1959  Ettema et al. ........................ 219/98
3,352,996  11/1967  Neumeier ............................. 219/98
2,342,144  2/1944  Hughes ................................ 219/98
3,291,958  12/1966  Glorioso .............................. 219/98

Primary Examiner—R. F. Staubly
Attorney—Richard B. Megley et al.

[57] ABSTRACT

A stud retaining collet enables a welding gun successively to receive and hold in welding position studs or the like having circumferentially enlarged head portions. The improved collet, especially useful in arc welding, has a base which, with an associated mechanism of the gun, effects non-spurting stud retention against forces feeding the studs and also is able to conduct the welding current to the stud.

7 Claims, 6 Drawing Figures

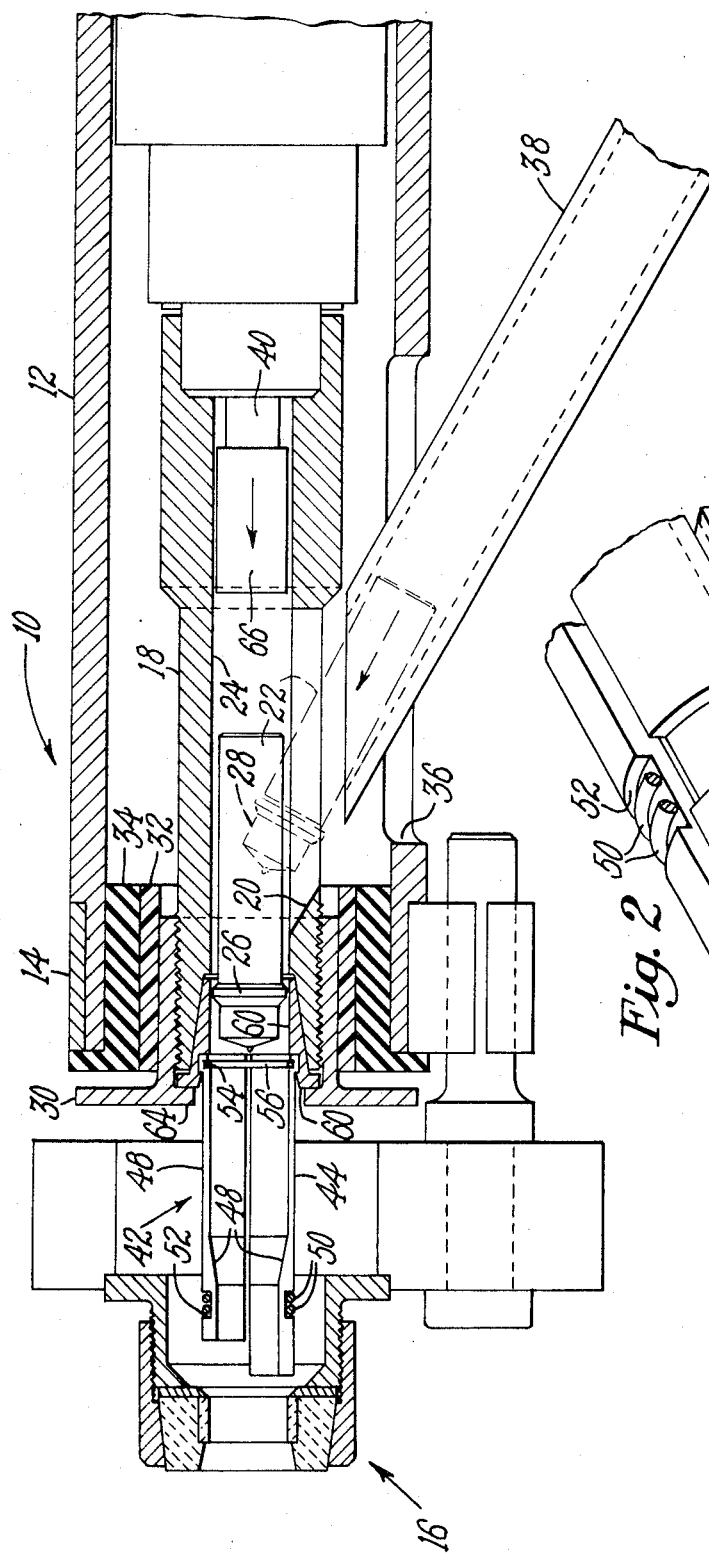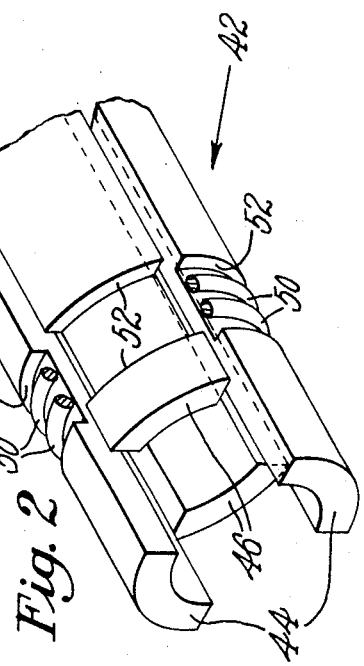

WELDING GUN MEANS FOR FEEDING AND HOLDING HEAD-BEARING STUDS OR THE LIKE

BACKGROUND OF THE INVENTION

It has hitherto been common in welding guns to employ a collet having jaws extending axially and integrally from a main body and adapted cooperatively to grip the stud or other member to be welded. It has recently been found advantageous, especially when a stud or the like to be end welded has a diameter of ¼ inch or larger, to employ circumferentially enlarged head portions or belts which radially project adjacent to the weldable end of the member. Such a stud is disclosed, for example, in U. S. Letters Patent No. 3,597,573 granted Aug. 3, 1971 in the name of Donald H. Ettinger.

The known gun collets are unsuited, by reason of the limited radial expansion of their integral gripping jaws, for axially receiving and passing to welding position a head-bearing stud or the like. In-feeding of the successive head-bearing studs through the collet means at its end remote from the welding end is deemed essential to automatic stud feeding in order to enable a piston rod, for instance, operable within the gun to advance each stud forwardly and support it protruding from the collet for welding. If the prior art holding collets are used when head-bearing studs are to be automatically fed and welded, it is found that on advancing the stud in the gun, even when the collet jaws are permitted to flex outwardly to a greater extent than normal, the enlarged head of the stud will, on emerging from the jaws under the urging of the piston rod, tend to leap or spurt outwardly therefrom as the jaws engage rearward portions of the stud having decreased diameter. Whether practicing arc welding or percussive welding in the gap mode, such lack of control over the stud is intolerable from the standpoint of attaining good welding joints by maintaining stud stabilization and proper welding current directed to the stud.

It will be understood that the terms "head" or "head-bearing stud" are employed herein to refer to any weldable member having a radial enlargement adjacent to the weldable end of the member and whether integral therewith or not, and whether symmetrical therewith or not.

SUMMARY OF THE INVENTION

In view of the foregoing it is an object of this invention to provide a welding gun of the automatically fed type which is provided with improved collet means for retaining and holding successive head-bearing studs or the like to be end welded.

Another object of this invention is to provide an improved gun for welding head-bearing studs or the like, the gun having an articulated collet holding mechanism and a telescoping member cooperative with the collet for advancing each stud in stabilized condition to welding position.

To these ends, and in accordance with a feature of the invention, an automatic welding gun comprises a holding collet having discrete stud-gripping, segmental fingers circularly arranged, symmetrically spaced sets of fingers or pairs of diametric fingers being partly axially offset or of different axial length than those circumferentially adjacent thereto by at least an axial dimension of the stud head, and mechanical means for connecting the fingers in radially expansible relation while maintaining them in electrically conducting relation to a current-carrying member in the main body of the gun. As shown herein, forward portions of the respective fingers are externally fitted with a spring for restraining radial displacement and/or deflection, and rearward portions of the fingers are internally acted upon by an expansion ring urging the collet to maintain conductive engagement with an internally tapered adapter releasably locked by a nut into a mating recess of a current-carrying portion of the gun.

A further feature of the invention resides in the provision, in combination with a hollow, articulate collet assemblage of the type indicated, of an axially telescoping ram or piston rod engageable endwise with the preferably bevelled, non-welding end of a stud or the like, the ram having a corresponding conical recess coaxial with the stud for stabilizing it as it is thereby advanced and then held against the work piece to which the stud is to be joined.

DESCRIPTION OF THE DRAWINGS

The foregoing and other features of the invention will now be more particularly described in connection with an illustrative embodiment and with reference to the accompanying drawings thereof, in which:

FIG. 1 is a longitudinal section of the forward portion of an arc welding gun having improved mechanism for feeding and holding successive head-bearing studs;

FIG. 2 is an enlarged perspective view of the forward end portion of a collet assembly shown in FIG. 1 and having gripping fingers longitudinally offset;

DESCRIPTION OF THE PREFERRED EMBODIMENT

Figure 6:
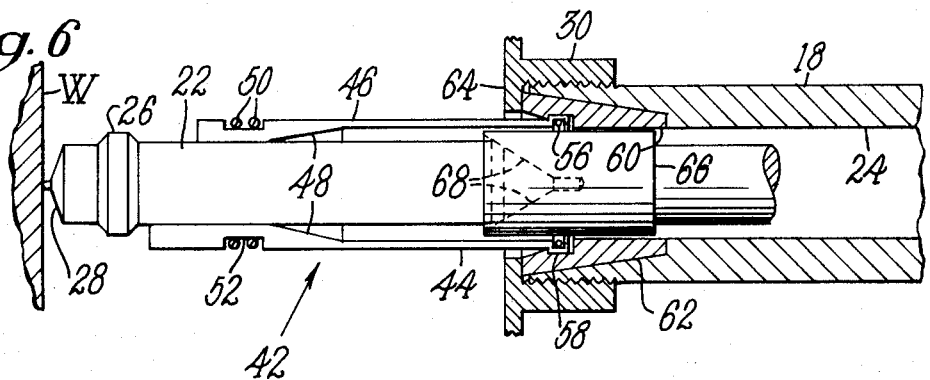

An illustrative welding gun generally designated 10 (FIG. 1) comprises a main hollow body 12 which may optionally carry at one end, by means of a clamping ring 14, an arc shield assembly generally designated 16. Coaxially mounted within the body 12 is a tubular guide 18 having an opening 20 in one side for the reception of successive studs 22 to be welded to a work piece W (FIG. 6). The guide 18 accordingly has a bore 24 only slightly larger in diameter than that of a head portion 26 formed on the stud 22 adjacent to its welding end 28. For securing the guide 18 in the body 12 a flanged nut 30 is threaded onto one end of the guide, and an insulating spacer 32 and bushing 34 are received in the body to center the nut 30. As shown in FIG. 1 an opening 36 in the body accommodates a delivery tube 38 arranged to guide successive studs 22 or the like into the bore 24 ahead of a reciprocable ram or piston rod 40 referred to subsequently. The rod 40 may be controlled by operation of a solenoid or other suitable means.

Figure 3:
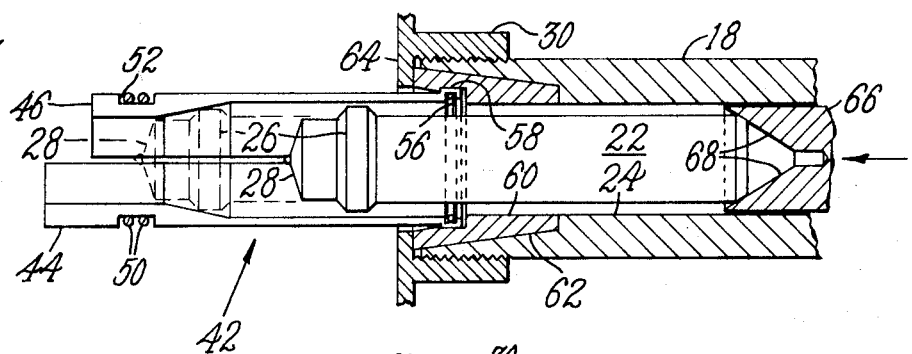
FIG. 3 is a longitudinal section showing a portion of the gun at the stage when its piston rod is about to advance a stud through the collet assembly.

A novel collet assembly generally designated 42 (FIGS. 1–6) about to be described is arranged to coaxially receive each stud 22 and the rod 40 in telescoping relation. The collet assembly 42 comprises diametrically disposed, discrete segmental pairs of gripping fingers 44,44 and 46,46; in this instance two pairs are shown and preferred although it will be apparent interlaced circumferential sets of more than two symmetrically spaced fingers may be employed if desired. The longer fingers 44,44 and the shorter fingers 46,46 respectively have an internal conical surface 48 arranged to be engaged substantially simultaneously as shown in FIG. 3 by the head portion 26 of a stud 22 being advanced by the rod 40 into welding position. Accordingly, the normally reduced internal exit diameter of the collet bore shown in FIG. 3 is enlarged by the fingers being displaced or deflected to the more widely open position shown in FIG. 4 against the resistance of a coil spring 50 (which may be a neoprene ring), the turn or turns of which are nested in slots 52 circumferentially formed on the exit ends of the fingers 44 and 46.

Rearward end of the fingers 44,46 are circumferentially with an inside groove 54 (FIG. 1) for receiving a contractable spring-like ring 56. This split ring 56, the adjacent ends of which may be forced together during circumferential contraction for collet removal, normally urges external rear flanges 58 of the fingers radially outward for seating and locking in a correspondingly shaped circular groove formed in an adapter 60. For insuring high and continuous conductivity of the welding current to the stud, the adapter 60 preferably has an external surface 62 tapered for mating contact with a correspondingly shaped conical recess in the end of the guide 18. By rotating the nut 30 its inner flange 64 may be brought to bear endwise on the adapter 60 thus insuring full engagement and maximum conductivity between the mated surfaces, and preventing the collet 42 from being displaced forwardly despite repeated feeding thrusts of the rod 40 on the studs.

Figure 4:
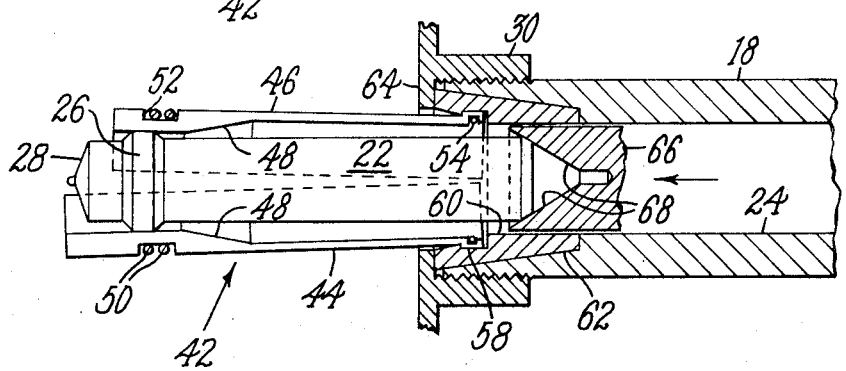
FIGS. 4–6, inclusive, are similar to FIG. 3 and show the parts in successive stages of an end welding operation.
Figure 5:
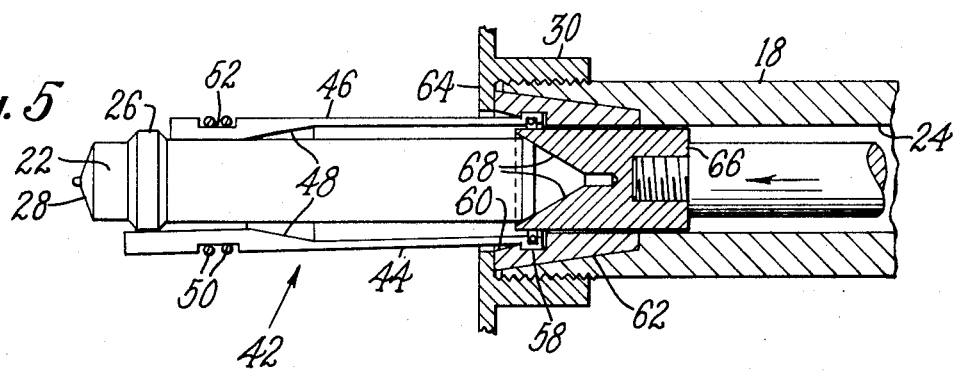

As shown in FIG. 4 the head portion 26 of the stud is engaged by the four fingers 44,46 to restrain its axial movement as it approaches the workpiece W. The fingers 46,46 being shorter and hence axially offset at their outer end portions from the fingers 44,44 are caused by the spring 50 shortly thereafter, as indicated in FIG. 5, to grip the trailing reduced diameter portion of the relatively advancing stud while only the longer fingers 44,44 engage and grip the head portion. Then lastly, as indicated in FIG. 6, the fingers 44 release the head portion and also grip only the lesser diameter of the stud. By thus effecting a continuous grip on the advancing stud and at least a two-stage release of its head portion 26, each stud is brought to bear on the work W by the rod 40 for welding by current which is at all times effectively delivered by the collet 42. At no time therefore is the head-bearing stud permitted to "squirt," i.e., spurt ahead of the rod 40 and assume an incorrect position or unstabilized condition.

It is of course desirable to hold the welding end of each stud securely in its selected position during welding. To insure placement of the welding end of the stud precisely as desired, an end of the rod 40 is fitted with a conically recessed socket member 66. Desirably, for instance, walls 68 of the recess may define an included angle of 60° and in bearing on each stud end will serve to center, stabilize, and guide the welding end of the stud.

The anti-spurt effect of the articulated collet 42 and the influence of the conically recessed feed rod 40 in overcoming any wobble tendency in the stud as it is brought to bear on the work W insure good control over each head-bearing stud 22 for attaining high quality welding points.

Having thus described my invention what I claim as new and desire to secure by Letters Patent of the United States is:

1. An arc welding gun for securing studs of the type respectively having a head portion adjacent to their weldable ends, said gun comprising a hollow main body housing a member for carrying a welding current, a stud-holding collet for receiving successive studs endwise from within the gun body, the collet comprising a plurality of interlaced sets of circumferential symmetrically spaced stud-engaging fingers defining a passageway for the studs, at least one of the sets of fingers extending axially beyond another set sufficiently to prevent spurting of the stud from the collet, and means for maintaining the fingers in electrically conductive relation to the current carrying member.

2. A gun for welding studs or the like respectively bearing head portions comprising, a collet having a circular series of stud-restraining fingers defining a passageway for the studs, spaced circumferentially symmetrical sets of the fingers being at least partly axially offset from the remaining fingers, a body for guiding studs into the passageway and for conducting welding current through the collet to a stud therein to be advanced axially through the passageway to a welding position, and mechanism for operatively connecting the collet to the body while holding the exit ends of the fingers in radially expansible relation to accommodate the head portions whereby each stud is restrained from spurting from the passageway and held under the control of the gun during welding.

3. An automatically fed welding gun comprising guide means defining a bore for successive head-bearing studs to be welded, a collet including a plurality of interlaced sets of segmental gripping fingers providing a passageway for the studs coaxial with the guide bore, means in the bore for advancing successive studs endwise therein and through the passageway, one set of the fingers axially extending beyond another sufficiently to prevent spurting of a stud from the collet, the fingers being radially displaceable from the passageway by the head-bearing portions of the respective studs, and mechanism for coupling the collet to the gun.

4. In a stud welding gun, a tubular guide having an axial bore provided with a diameter slightly larger than the head portion of head-bearing studs therein to be welded, a reciprocable rod in the bore for feeding the studs, and a segmental collet coaxially mounted for receiving the successive studs endwise from said bore, each of said collet segments being discrete and having an internally tapered surface for collectively defining the reduced diameter portion of the studs, the collet having a spring means for yieldingly limiting radial displacement of its segments upon engagement of each head with the tapered surface, and a plurality of interlaced sets of the collet segments axially extending beyond another set at their exit ends to avoid spurting of a stud therefrom.

5. A collet for mounting in a welding gun adapted to secure studs and the like to a work piece and respectively having circumferentially enlarged head portions adjacent to their weldable ends, said collet comprising a plurality of cooperative interlaced sets of stud gripping fingers circumferentially arranged to define a passageway for the studs, at least one of the sets axially extending beyond the remaining sets of fingers, means for radially limiting enlargement of an exit portion of said passageway upon internal engagement of the head portions with the fingers during advance of the successive studs toward the work piece, and mechanism for maintaining the fingers connected for operative assembly in the gun.

6. A collet as set forth in claim 5 wherein the means for limiting the exit portion of the passageway comprises a circumferential slot formed on the fingers externally, and a spring-like means nested in the slot.

7. A collet as set forth in claim 6 wherein the internal walls of the assembled fingers are respectively tapered from a diameter slightly larger than that of the stud head portion to a diameter nearer the exit end of the collet which enables said spring-like means to cause the cooperative sets of fingers successively to release the head portion and then engage the trailing shank portion of the stud.

* * * * *